United States Patent [19]
de Graff

[11] 3,800,468
[45] Apr. 2, 1974

[54] PROTECTIVE ENCLOSURE FOR PLANTS
[75] Inventor: David de Graff, Williamstown, N.Y.
[73] Assignee: Joan L. de Graff, Williamstown, N.Y.
[22] Filed: Dec. 13, 1972
[21] Appl. No.: 314,510

[52] U.S. Cl.............................. 47/28, 135/3 R, 47/17
[51] Int. Cl............................................. A01g 13/00
[58] Field of Search................ 47/17, 19, 26, 28–31; 135/1 R, 3 R, 4 R, 14 D, 15

[56] References Cited
UNITED STATES PATENTS

| 3,701,241 | 10/1972 | Zuckerman | 47/26 |
| 2,326,548 | 8/1943 | Mierson | 47/29 |
| 963,099 | 7/1910 | Wells | 47/28 |
| 379,274 | 3/1888 | Hamilton | 47/26 |
| 2,910,994 | 11/1959 | Joy | 47/28.1 |
| 3,653,150 | 4/1972 | Howard | 47/29 |

FOREIGN PATENTS OR APPLICATIONS

| 1,075,888 | 2/1960 | Germany | 47/28.1 |
| 1,423,804 | 11/1965 | France | 47/29 |
| 1,095,974 | 12/1967 | Great Britain | 47/29 |
| 1,437,333 | 3/1966 | France | 47/29 |
| 800,208 | 6/1936 | France | 47/29 |
| 1,095,987 | 12/1967 | Great Britain | 47/17 |

Primary Examiner—Robert E. Pulfrey
Assistant Examiner—Eugene H. Eickholt
Attorney, Agent, or Firm—Bruns & Jenney

[57] ABSTRACT

An economical and easy to erect enclosure for protecting young plants and inducing early maturity. The enclosure comprises a fluid ballasted, bow or hoop supported tunnel of translucent sheet material which encloses a row of the plants. The sheet material is stretched over the bows and where the longitudinal edges of the sheet meet the ground they are formed with continuous pockets or passages that can be filled with fluid ballast such as water to help anchor the sheet in position.

6 Claims, 6 Drawing Figures

PATENTED APR 2 1974 3,800,468
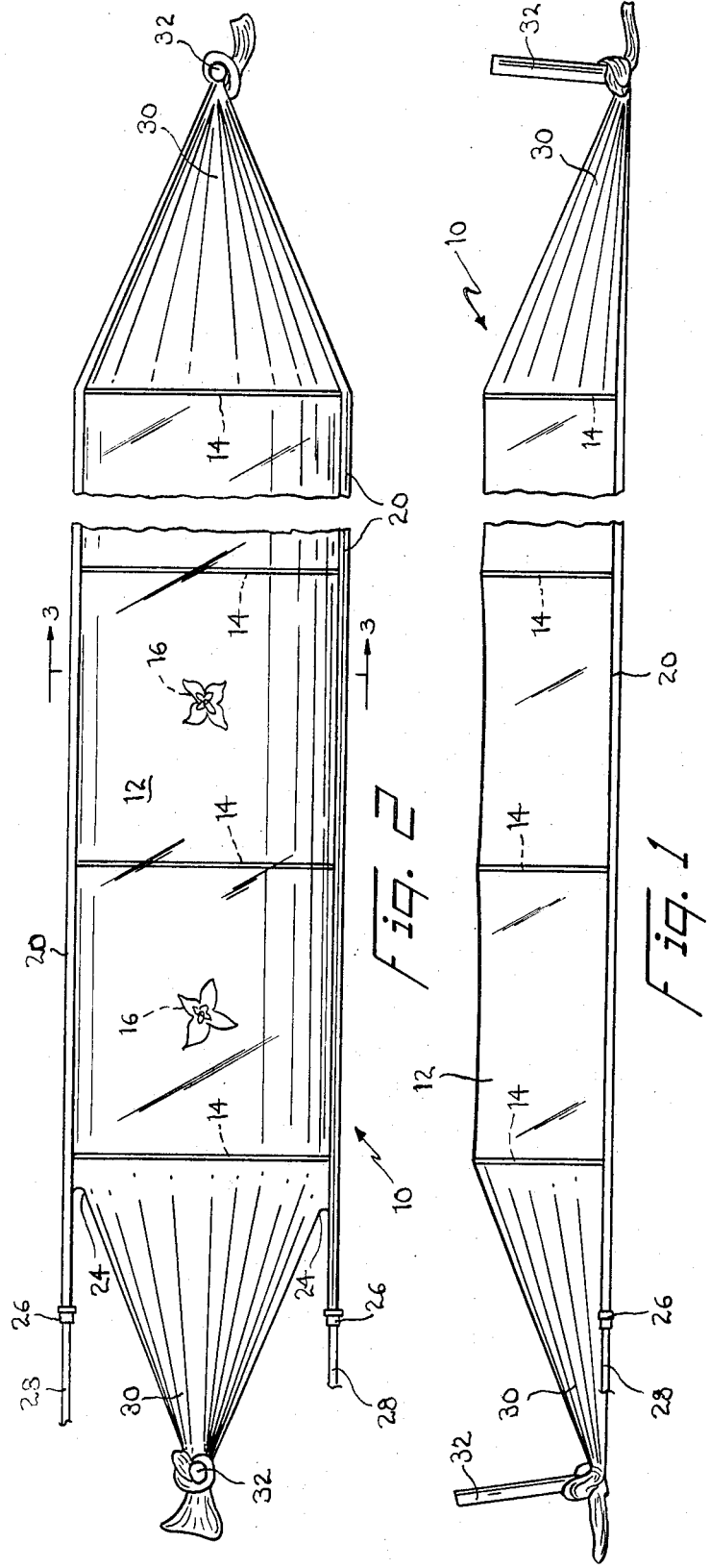
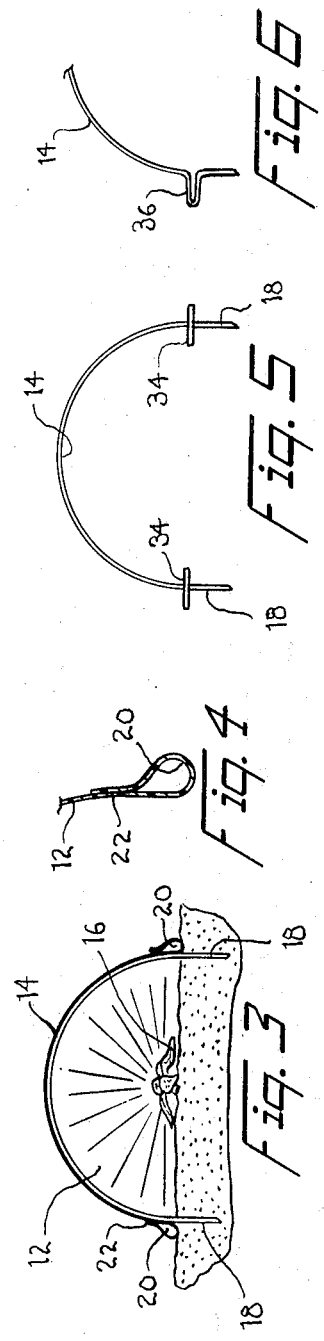

PROTECTIVE ENCLOSURE FOR PLANTS

BACKGROUND OF THE INVENTION

This invention relates generally to plant husbandry, and has particular reference to a very economical protective enclosure for young plants.

Probably the most common way of protecting plants against damaging weather conditions and of inducing early maturity in young plants is by means of a greenhouse. Greenhouse construction, however, is relatively expensive and the resultant structures are fixed and permanent in nature.

For field grown plants needing protection, individual hot caps or hot tents are often used but a very large number of these are required and placing them in position and retrieving them can be laborious and time consuming. More pertinent to the present invention is a machine, disclosed in U.S. Pat. No. 3,353,297, that forms soil banks on both sides of a row of seeds or seedlings and then lays a continuous sheet of plastic film over the soil banks.

Another type of enclosure, more sophisticated than hot caps but normally less expensive and permanent than a greenhouse, is the inflatable structure or tunnel. Examples of these are shown in U.S. Pat. Nos. 2,837,101 and 2,910,994 and French Pat. No. 1,381,411 (1964). Inflatable enclosures, of course, have the disadvantage of requiring auxiliary apparatus for inflating and maintaining inflation.

SUMMARY OF THE INVENTION

The protective enclosure of the present invention is particularly adapted for use with seedlings or young plants that are disposed in rows, and comprises a tunnel of translucent plastic material that is supported above the plant row by spaced arch members the ends of which are inserted in the ground. The side edges of the plastic tunnel are maintained in ground contact by fluid ballasting, i.e., the edges are formed with continuous pockets or passages that can be filled with water or other fluid to weight the edges down. At the opposite ends of the row of arch members, the sheet material tunnel can be anchored to the ground as by stakes.

The enclosure provided by the invention utilizes low cost materials and it can be quickly and easily erected. If desired, the arch members can be inserted in the ground and the tunnel material stretched thereover by machine. In addition to being economical, the enclosure has the advantage of being easily stored and of being usable over and over again wherever needed.

BRIEF DESCRIPTION OF THE DRAWINGS

FIG. 1 is a fragmentary side elevation of a protective enclosure embodying the invention;

FIG. 2 is a top plan view thereof;

FIG. 3 is a transverse section through the enclosure taken on line 3—3 of FIG. 2;

FIG. 4 is an enlarged detail view, in section, of a fluid ballast pocket;

FIG. 5 is an elevation of a supporting arch member provided with means for controlling the depth that the member is inserted in the ground; and FIG. 6 is a fragmentary elevation corresponding to FIG. 5 showing a modified dept control means.

DESCRIPTION OF THE PREFERRED EMBODIMENT

Having reference now specifically to the drawings, the protective enclosure is generally indicated at 10 and is essentially comprised of an elongated sheet or strip 12 of flexible plastic material that is supported in tunnel configuration by a row of spaced arch members 14. Because inducing early maturity in the plants 16 within the enclosure is one of its purposes, the plastic material is transparent or at least translucent. The arch members 14, also referred to as bow or hoop members, are bent rods of metal, plastic or other suitable material, the sharpened ends 18 of which are inserted in the ground on opposite sides of the plant row as best shown in FIG. 3.

In order to hold the plastic sheet 12 in position on the bows 14 and maintain its longitudinal edges in ground contact, the latter are provided with continuous ballast receiving pockets or passages 20. These pockets are formed as by folding the sheet along its edges and sealing it to itself at 22 as shown in FIG. 4. At one end of the tunnel, the sheet 12 is cut away (as at 24) from the closed edge pockets 20 andthd ends of the latter are connected by hose clamps 26 or the like to plastic or rubber hoses 28. The opposite ends of the pockets can be sealed off by any suitable means.

The ends of the protective tunnel are closed by gathering the sheet ends 30 together and tying them to stakes 32, the stakes being driven into the ground at points spaced from the end arch members 14 as shown. With this arrangement, the end stakes 32 and ballast receiving pockets 20 coact to hold the sheet 12 in position on the arches. For ease in filling and emptying the pockets 20, the ballast is preferably a fluid, water normally being the most convenient. Thus, the pockets can be filled through the hoses 28 with water from a low pressure water system. As indicated in FIG. 3, sheet 12 is so dimensioned in relation to the arch members that the fluid filled pockets 20 rest on the ground directly adjacent the arch member legs.

To insure that all of the arch members 14 are driven substantially the same distance into the ground, the legs of the members can be provided with ground surface engaging stop means such as the flanges or collars 34 in FIG. 5. Alternatively, the legs of the members can be bent as at 36, FIG. 6, to form the stops. This prevents tunnel sagging where a member is driven too far into the ground, or failure of the ballast pockets 20 to reach the ground where a member has not been driven in far enough.

The protective tunnel disclosed serves a twofold purpose. First, it protects young plants 16 against damaging weather conditions such as frost, hail, high winds, etc. Second, by concentrating and retaining heat and moisture within the enclosure, it induces early maturity in the plants.

From the foregoing description it will be apparent that the present invention provides an economical and easy to erect enclosure for protecting young plants and inducing early maturity. As will be understood by those familiar with the art, the invention may be embodied in other specific forms without departing from the spirit or essential characteristics thereof.

I claim:

1. A protective enclosure for a plurality of plants planted in a row in the ground, the enclosure comprising a row of spaced, substantially parallel, relatively rigid, substantially U-shaped arch members the ends of each of which are inserted in the ground on either side of the plant row so that the members are disposed in upright position in bridging relation to the row, stop means on each arch member a predetermined distance from each of its opposite ends thereof to limit insertion of the opposite ends to a predetermined depth into the ground, a separate, elongated sheet of flexible material through which light can pass positioned over the arch members so as to be supported thereby, and having opposite, substantially parallel longitudinal edges, the longitudinal edges of the sheet having closed ballast receiving pockets substantially commensurate in length with the length of the sheet, said ballast receiving pockets including free end portions spaced from the edge of the sheet through which ballast can be added to the pockets, the sheet being dimensioned so that said ballast pockets rest on the ground on either side of the plant row adjacent the ground entering ends of the arch members and maintain the sheet securely in position over the arch members when the stop means on the arch members are against the ground, and sheet anchoring means spaced from the opposite ends of the arch member row, the opposite ends of the elongated sheet being secured to said anchoring means.

2. A protective enclosure as defined in claim 1 wherein the ballast receiving pockets are filled with a fluid.

3. A protective enclosure as defined in claim 1, wherein the sheet material is clear plastic.

4. A protective enclosure as defined in claim 1, wherein said anchoring means comprises a stake member spaced from the arch member at each end of the arch member row, the opposite ends of the elongated sheet being respectively gathered and tied to the stake members.

5. A protective enclosure as defined in claim 1, wherein said stop means comprise circular collars fixed on the arch members.

6. A protective enclosure as defined in claim 1, wherein said stop means comprise integral portions of said arch members bent laterally outwardly between the ends thereof.

* * * * *